United States Patent
Iovanna et al.

(10) Patent No.: US 11,620,163 B2
(45) Date of Patent: Apr. 4, 2023

(54) CONTROLLING RESOURCE ALLOCATION IN A DATA CENTER BY MONITORING LOAD ON SERVERS AND NETWORK LINKS

(71) Applicant: Telefonaktiebolaget LM Ericsson (publ), Stockholm (SE)

(72) Inventors: Paola Iovanna, Pisa (IT); Francesco Giurlanda, Pisa (IT); Teresa Pepe, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/339,421

(22) PCT Filed: Oct. 5, 2016

(86) PCT No.: PCT/EP2016/073812
§ 371 (c)(1),
(2) Date: Apr. 4, 2019

(87) PCT Pub. No.: WO2018/065051
PCT Pub. Date: Apr. 12, 2018

(65) Prior Publication Data
US 2019/0235922 A1    Aug. 1, 2019

(51) Int. Cl.
*G06F 9/50* (2006.01)
*G06F 9/48* (2006.01)
(Continued)

(52) U.S. Cl.
CPC ............ *G06F 9/505* (2013.01); *G06F 9/4856* (2013.01); *G06F 9/5088* (2013.01);
(Continued)

(58) Field of Classification Search
None
See application file for complete search history.

(56) References Cited

U.S. PATENT DOCUMENTS

| | | | |
|---|---|---|---|
| 7,623,455 B2 * | 11/2009 | Hilla | H04L 45/60 370/232 |
| 9,588,816 B2 * | 3/2017 | Zhu | G06F 9/5077 |

(Continued)

FOREIGN PATENT DOCUMENTS

| | | | |
|---|---|---|---|
| CN | 106411733 A | * | 2/2017 |
| EP | 2651101 A1 | | 10/2013 |
| WO | 2004086727 A2 | | 10/2004 |

OTHER PUBLICATIONS

Baguena, Miguel, et al., "Towards Enabling Hyper-Responsive Mobile Apps Through Network Edge Assistance", 2016 13th IEEE Annual Consumer Communications & Networking Conference (CCNC), Jan. 2016, 1-6.

(Continued)

*Primary Examiner* — Abu Zar Ghaffari
(74) *Attorney, Agent, or Firm* — Sage Patent Group

(57) ABSTRACT

A method controls resource allocation in a data center. The method comprises identifying a first computational task to be transferred from a first set of one or more servers. The method also comprises identifying a second set of one or more servers to which the first computational task may be transferred, by using the respective current computational load of the second set of servers to determine that the second set of servers has sufficient available computational resources to implement the computational task and identifying network links for transferring the computational task and using the respective transmission loads of the identified links to determine that there is sufficient network capacity to transfer the computational task from the first set of servers to the second set of servers. The method then comprises transferring the computational task from the first set of servers to the second set of servers.

18 Claims, 10 Drawing Sheets

(51) Int. Cl.
  *G06F 9/455* (2018.01)
  *H04L 67/1004* (2022.01)
(52) U.S. Cl.
  CPC ...... *H04L 67/1004* (2013.01); *G06F 9/45558* (2013.01); *G06F 2009/4557* (2013.01); *G06F 2009/45595* (2013.01); *G06F 2209/5011* (2013.01); *Y02D 10/00* (2018.01)

(56) References Cited

U.S. PATENT DOCUMENTS

| | | | | |
|---|---|---|---|---|
| 2004/0210671 | A1* | 10/2004 | Beadle | H04L 69/40 709/239 |
| 2006/0010449 | A1* | 1/2006 | Flower | G06F 9/5044 718/102 |
| 2008/0256223 | A1* | 10/2008 | Chan | H04L 67/1008 709/223 |
| 2009/0276771 | A1* | 11/2009 | Nickolov | H04L 67/1014 717/177 |
| 2010/0049842 | A1 | 2/2010 | Koski | |
| 2010/0274933 | A1* | 10/2010 | Wang | G06F 3/0634 710/22 |
| 2012/0144394 | A1* | 6/2012 | Prabhakar | G06F 9/4893 718/102 |
| 2012/0179824 | A1* | 7/2012 | Jackson | H04L 47/827 709/226 |
| 2012/0304182 | A1* | 11/2012 | Cho | G06F 9/4881 718/102 |
| 2012/0324092 | A1 | 12/2012 | Brown et al. | |
| 2013/0080641 | A1* | 3/2013 | Lui | H04L 43/045 709/226 |
| 2013/0086235 | A1* | 4/2013 | Ferris | G06F 9/505 709/223 |
| 2014/0075222 | A1 | 3/2014 | Jackson | |
| 2014/0075445 | A1* | 3/2014 | Wang | G06F 21/40 718/104 |
| 2014/0101226 | A1* | 4/2014 | Khandekar | H04L 67/1031 709/203 |
| 2014/0196054 | A1* | 7/2014 | Brochard | G06F 9/505 718/105 |
| 2014/0304396 | A1 | 10/2014 | Della Corte et al. | |
| 2015/0039764 | A1* | 2/2015 | Beloglazov | H04L 47/70 709/226 |
| 2015/0046589 | A1* | 2/2015 | Garza | G06F 9/45558 709/226 |
| 2015/0135183 | A1* | 5/2015 | Kipp | G06F 9/5038 718/103 |
| 2015/0220370 | A1* | 8/2015 | Ujibashi | G06F 9/5088 718/104 |
| 2015/0263983 | A1* | 9/2015 | Brennan | H04L 41/5045 709/226 |
| 2016/0070601 | A1* | 3/2016 | Yamamoto | G06F 9/5077 718/105 |
| 2016/0072713 | A1* | 3/2016 | Mhatre | H04L 67/42 709/235 |
| 2016/0072726 | A1* | 3/2016 | Soni | H04L 41/0896 709/208 |
| 2016/0092266 | A1* | 3/2016 | Bavishi | G06F 9/505 718/1 |
| 2016/0098292 | A1* | 4/2016 | Boutin | G06F 9/4881 718/104 |
| 2016/0217010 | A1 | 7/2016 | Krishnan et al. | |
| 2016/0226966 | A1* | 8/2016 | Lin | H04L 47/781 |
| 2017/0214737 | A1* | 7/2017 | Agarwal | H04L 69/326 |
| 2017/0300365 | A1* | 10/2017 | Liu | G06F 9/505 |

OTHER PUBLICATIONS

Fera, M. Arun, et al., "A Novel Agent Based Match Making Algorithm in Multi-Tenant Architecture", 2015 Seventh International Conference on Advanced Computing (ICoAC), Dec. 2015, 1-6.

Summons to Attend Oral Proceeding Communication for EP Application No. 16778339.8 dated May 30, 2022, 11 pages.

Ioannis Karamitsos et al., "Study of Flow Streams as a Performance Parameter for Data Centers", 2015 11th International Conference on Innovations in Information Technology (IIT), Nov. 1, 2015, pp. 235-238, XP032849297.

Kanonakis Konstantinos et al., "SDN-Controlled Routing of Elephants and Mice Over a Hybrid Optical/Electrical DCN Testbed", 2015 Optical Fiber Communications Conference and Exhibition (OFC), OSA, Mar. 22, 2015, pp. 1-3, XP032784365.

Polatis, "SDN-Enabled All-Optical Circuit Switching: An Answer to Data Center Bandwidth Challenges", Feb. 26, 2015, pp. 1-6, XP055286410.

Tiago Fioreze et al., "Self-Management of Hybrid Optical and Packet Switching Networks", Integrated Network Management (IM), 2011 IFIP/IEEE International Symposium on, IEEE, May 23, 2011, pp. 946-951, XP032035364.

Akhilesh S. Thyagaturu et al, "Software Defined Optical Networks (SDONs): A Comprehensive Survey", IEEE Communications Surveys & Tutorials, Jul. 1, 2016, vol. 18, No. 4, pp. 2738-2786, XP055922079.

Paola Iovanna et al., "Effective Elasticity for Data Centers Interconnection in Multi-Domain WAN: Information Modelling and Routing", 2015 European Conference on Optical Communication (ECOC), Viajes El Corte Ingles, Vecisa, Sep. 27, 2015, pp. 1-3, XP032819974.

* cited by examiner

CONTROLLING RESOURCE ALLOCATION IN A DATA CENTER BY MONITORING LOAD ON SERVERS AND NETWORK LINKS

TECHNICAL FIELD

The technical field is data center networks.

BACKGROUND

Data centers or large clusters of servers have become increasingly employed in universities, enterprises and consumer settings to run a variety of applications such as web services, instant messaging, gaming, data analysis, scientific computing and many others. Data centers typically comprise many thousands of servers arranged hierarchically, typically with racks containing 10-40 servers each, linked by a Data Center Network (DCN).

Large modern data centers are typically organized into Performance Optimized Data centers (PODs). A POD is a pool of computing and storage resources that typically holds thousands of servers. Data centers are typically organized into physical PODs that provide the resources necessary to manage a particular workload. Typically, a set of PODs are statically assigned to a workload to provide the required resources. Thus, since the variability in resource demands by different services and applications and the necessity to perform a long term resources allocation, the PODs are selected to manage the peak demand, causing a low level of resource utilization. Load balancing techniques are often used to improve resource utilization.

Recently this has led to the concept of the virtual POD (vPOD) concept. The vPOD architecture enables a virtual set up of physical hardware components providing an optimal combination of compute and storage hardware for a specific workload, without waste of resources. Load balancing techniques allow workloads to be moved to underloaded PODs. In vPOD architectures, a POD can give up unused resources to another POD that, for instance, needs to enlarge its compute capabilities, resulting in improved resources utilization. FIG. 1 is a schematic diagram of the vPOD concept 1, showing how resources, namely storage 2, network capacity 3 and compute facilities 4 are distributed between vPODs. Three vPODs, vPOD A 5, vPOD B 6 and vPOD C 7 are illustrated. These vPODs are expandable 8, and may also be contracted as necessary.

Workload allocation is performed taking into account information about storage and computing. However, migration of workloads can generate very large data flows often referred to as "elephant flows", requiring very large bandwidth and can cause congestion in the network and degradation of performance. With current Data Center network architectures, provisioning the necessary bandwidth between dynamically changing sets of nodes requires the building of non-blocking switch fabrics at the scale of an entire data center. Although, it is possible to construct a non-blocking switch fabric to interconnect all of the servers within an individual POD, interconnecting hundreds to thousands of such PODs to form a larger data center remains a significant challenge. Indeed, it could be expensive and difficult to perform on demand.

Recently, hybrid electronic and optical switching architectures have been proposed to overcome the limitation of packet switching architectures. In such a context, detection techniques are used to identify traffic flows and consequently route them on the two switching layers depending on the flows requirements (e.g., latency, duration, energy consumption, signal rate). However, typically such solutions may not be efficient and scalable.

SUMMARY

The present disclosure seeks to overcome the problem described above, by taking into account network resources as well as computing and storage requirements when assigned, reallocating workloads or computational tasks.

In a first aspect there is provided a method of controlling resource allocation in a data center, the data center comprising a plurality of servers connected by a plurality of network links. The method comprises monitoring a respective current computation load for each server, each computational load comprising one or more computational tasks and monitoring a respective transmission load for each link and identifying a first computational task to be transferred from a first set of one or more servers. The method further comprises identifying a second set of one or more servers to which the first computational task may be transferred, by using the respective current computational load of the second set of servers to determine that the second has sufficient available computational resources to implement the computational task and identifying network links for transferring the computational task and using the respective transmission loads of the identified links to determine that the that there is sufficient network capacity to transfer the computational task from the first set of servers to the second set of servers. The computational task is then transferred from the first set of servers to the second set of servers.

In an embodiment, the first computational task is transferred in response to the first set of servers being identified as overloaded.

In an embodiment, the first set of servers being identified as overloaded comprises determining whether the current computational load of the first set of servers is above a first threshold.

In an embodiment, determining that the second set of servers has sufficient capacity comprises determining whether the current computational load of the second set of servers is below a second threshold.

In an embodiment the method further comprises, prior to the transfer of the computational task, transferring a second computational task from the second set of servers to a third set of servers.

In an embodiment the step of identifying the second set of servers comprises determining an optimal set of servers based on both the available computational resources of the servers and a network capacity used by the servers.

In an embodiment selecting one set of servers is based on a bandwidth available to transfer the computational load to each of the sets of servers.

In an embodiment the step of identifying the second set of servers comprises using the monitoring of network load to identify a subset of sets of servers for which there is sufficient network capacity to transfer the computational task and selecting, based on an optimization, one set from the plurality of sets.

In an embodiment selecting one set of servers is based on one or more of: the computational load of each of the sets of servers, a computational speed of each of the sets of servers, a power consumption of each of the sets of servers and a bandwidth available to transfer the computational task to each of the sets of servers.

In an embodiment the step of identifying the second set of servers comprises using the monitoring of computational load to identify a subset of sets of servers which have sufficient available computational resources to implement the computational task and selecting, based on an optimization, one set from the subset of sets.

In an embodiment selecting one set of servers is based on a bandwidth available to transfer the computational to each of the sets of servers.

In an embodiment the method further comprises implementing an optimization algorithm to determine if a rearrangement of computational tasks is possible which will enable the transfer of the computational task from the overloaded set of servers.

In an embodiment the method further comprises implementing an optimization algorithm to determine if a rearrangement of computational tasks is possible which will either reduce one or more of: power consumption, network congestion and server overload or increase one or more of computation speed on one or more servers, and network quality of service.

In an embodiment the algorithm is a multi-objective algorithm.

In an embodiment the algorithm is one of a genetic algorithm and a heuristic algorithm.

In an embodiment the monitoring of network load further comprises identifying very high bandwidth flows, wherein a very high bandwidth flow is a flow with a bandwidth requirement higher than a bandwidth threshold.

In an embodiment the monitoring of network load further comprises predicting one or more of:
network usage and server usage.

In an embodiment the predicting comprises using an extensible Markov Model.

In a second aspect there is provided a controller for a data center network comprising a plurality of servers connected by a plurality of network links. The controller comprises a processor, a memory for storing instructions and data, a transmitter for transmitting data to the communications network, and a receiver for receiving data from the communications network. The controller is configured to monitor a respective current computation load for each server, each computational load comprising one or more computational tasks, monitor a respective transmission load for each network link, identify a first computational task to be transferred from a first set of one or more servers, identify a second set of one or more server to which the first computational task may be transferred, by using the respective current computational load of the second set of servers to determine that the second set of servers has sufficient available computational resources to implement the computational task and identifying network links for transferring the computational task and using the respective transmission loads of the identified links to determine that the that there is sufficient network capacity to transfer the computational task from the first set of servers to the second set of servers and provide instructions to transfer the computational task from the first set of servers to the second set of servers.

In a third aspect there is provided an apparatus for use in a controller for a data center network comprising a plurality of servers connected by a plurality of network links, the network controller comprising a first monitoring unit for monitoring server loads, a second monitoring unit for monitoring network loads, a first identifying unit for identifying a first computational task to be transferred from a first set of one or more servers, a second identifying unit a second set of one or more servers to which the first computational task may be transferred and a transferring unit for providing instructions to transfer a computation task.

In a fourth aspect there is provided a data center comprising a controller according to the second or the third aspects.

In a fifth aspect there is provided a computer program, comprising instructions which, when executed on at least one processor, cause the at least one processor to carry out a method according to the first aspect.

In a sixth aspect there is provided a computer program product comprising a computer program according to the fifth aspect.

In a seventh aspect there is provided a carrier containing the computer program product according to the sixth aspect, wherein the carrier optionally includes an electrical signal, an optical signal, a radio signal, a magnetic tape or disk, an optical disk or a memory stick.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art.

The present disclosure takes into account not only the computation load on servers in the data center, but also the load on network links which connect those servers. This ensures that when a reallocation of computational tasks is implemented, the network has sufficient available capacity to transfer tasks to selected servers. A computational task may be any task performed on a server or memory within a data center. It may be a virtual machine, other types of computer program or storage of data. A computational task may be part of a larger computational task. Hence when reference is made to the transfer of a computational task, it may be an entire program, virtual machine, storage etc., or it may be part of any of these. A computational task may be divided between servers or sets of servers, in which case each part of the computational task is itself a computational task.

The monitoring of the computational load of the servers and the capacity of the network provides for a selection of the one or more servers based on a joint optimization of the server computational capacity and a network capacity used by the servers, e.g. based on the one or more network links. In some instances, a full optimization is not possible, in which case the best practically achievable solution is used. In some examples, a set of servers may be selected for a computational task based on its network connection (as well as its computational capacity). Thus, a set of servers which has computational capacity is not selected due to network constraints, e.g. congestion in the communication network between servers. The network constraint, e.g. congestion, and server load, may be monitored or predicted. In a further example, a server may be selected due to requiring less network resources or causing less network congestion than another server. The selection of a computational resource, e.g. identification of a server, is based on both the capacity of the servers and the capacity of the network connecting the servers. The computational resources and network resources available are considered together (e.g. as inputs to an optimization algorithm), to select a set of one or more servers which is determined to most effectively use the available computational resources and the network resources of the data center.

Figure 1:
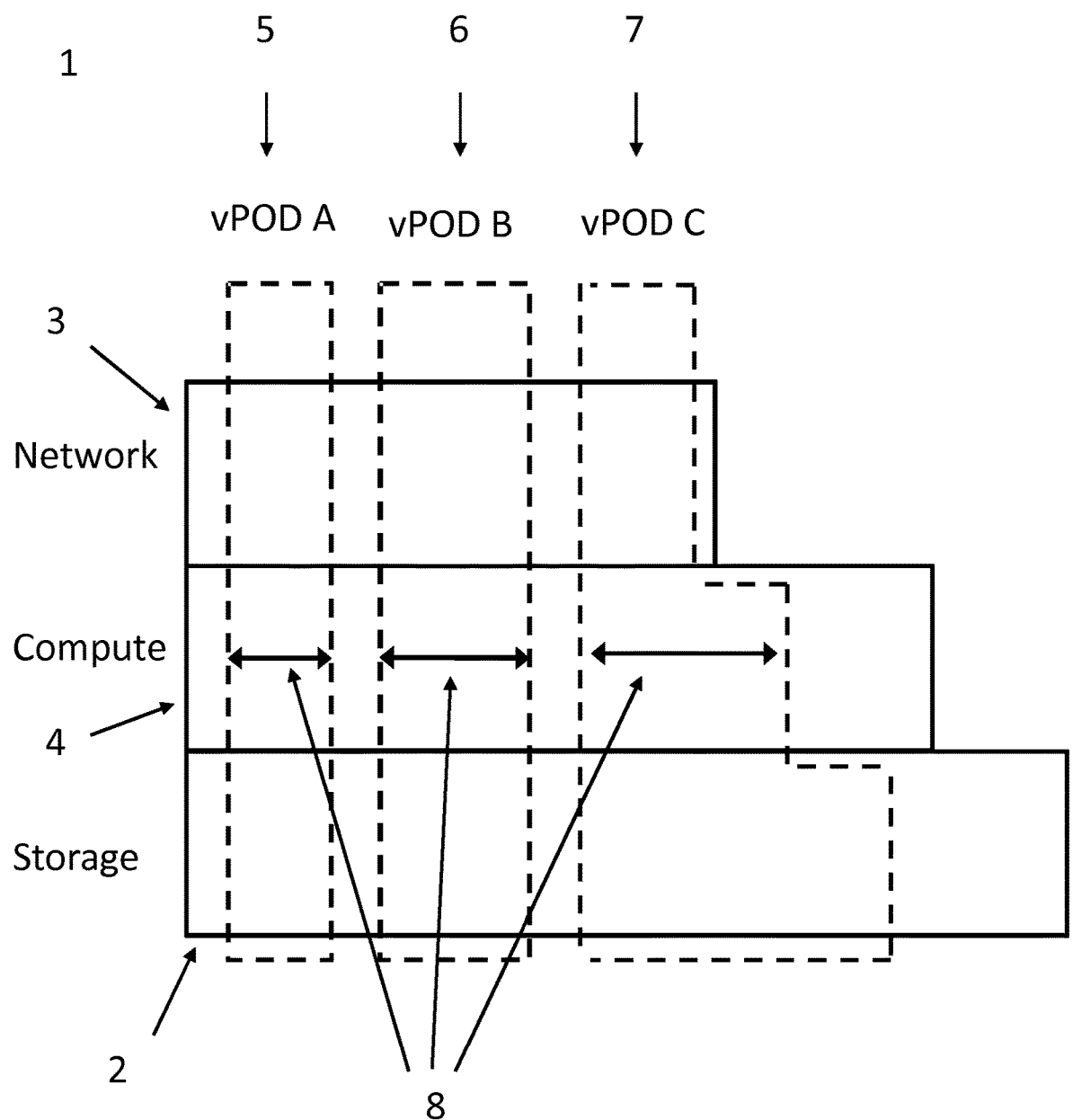
FIG. 1 is a schematic diagram illustrating the Virtual POD concept.
Figure 2:
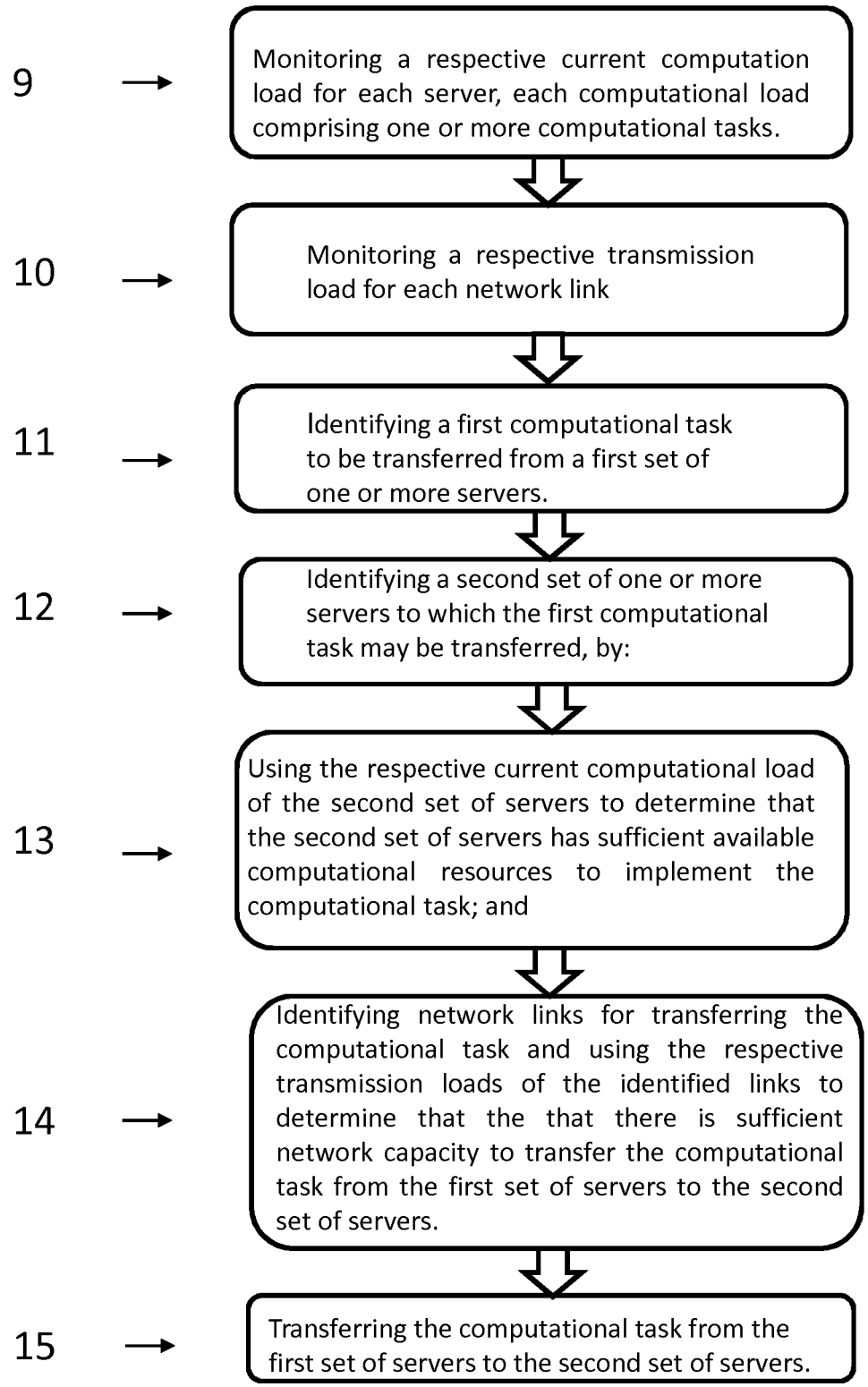
FIG. 2 is a flow chart illustrating a method of reallocating a computational task according to an embodiment.

FIG. 2 is a flow chart which illustrates the steps of a method of re-allocating workloads between servers according to an embodiment. The respective computational loads of each of a plurality of servers is monitored 9. At the same time, the transmission load of each of a plurality of network links is monitored 10. A computational task is identified to be transferred from a first set of one or more servers 11. In an embodiment, the set of servers comprises a single server on which a computational task is implemented. Alternatively, the computational task may be implemented on multiple servers, and the set of servers comprises a plurality of servers. In an embodiment this set of servers is a virtual POD. When reference is made to a set of servers, this can mean a single server or a plurality of servers. In an embodiment, identification of a computational task to be transferred is implemented as a result of the server being identified as being overloaded. In an embodiment, a server may be identified as being overloaded on the basis that its processor or memory usage is above a given threshold. Alternatively, it may be identified as overloaded on the basis that one or more tasks performed by the server are being processed at a speed below a given threshold. The overloading of a set of servers may result from a single server of the set being overloaded or the set being collectively overloaded. There may be more than one overloaded server in the set of servers. Once a server has been identified as overloaded, one or more of its assigned computational tasks may be identified as being suitable to be moved to another server. The identification of the task or tasks to be transferred may be on the basis of the size of the task, the availability of resources or the result of an optimization algorithm. The person skilled in the art will recognize that there are a large number of alternative ways of identifying tasks to be transferred and the invention is not limited to any one method.

The next step comprises identifying a second set of one or more servers to which the first computational task may be transferred 12. This step comprises using the respective current computational load of the second set of servers to determine 13 that the second set of servers has sufficient available computational resources to implement the computational task and identifying network links for transferring the computational task and using the respective transmission loads of the identified links to determine that the that there is sufficient network capacity to transfer the computational task from the first set of servers to the second set of servers 14. In an embodiment, determining that the second set of servers has sufficient capacity comprises determining whether the current computational load of the second set of servers is below a second threshold. The determining as to whether the second set of servers has sufficient available computational resources may comprise checking the loads on each server individually and/or checking the collective load of the set. In the final step of the method, the computational task is then transferred from the first set of servers to the second set of servers 15.

The combined monitoring of both server and network load allows load balancing of workloads among PODs whilst taking into account also the network status. Load balancing between servers may be achieve without increasing congestion in the underlying network and hence without compromising the performance of the other workloads. The method is an enabler of POD virtualization since it provides a flexible and automatic way to reassign resources among workloads.

Taking into account both data center resource utilization and the network status makes it possible to decide to extend a POD towards other PODs that not only are less loaded in terms of computational resource, but are also connected via unloaded network connections. Hence they can be hence reached with at low cost and with a required quality of Service (QoS). For example, latency requirements and performance constraints specific of a particular application can be satisfied.

Figure 3:
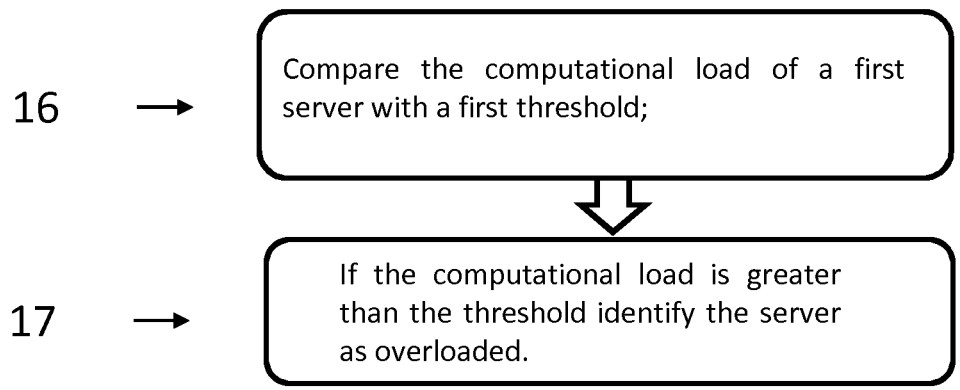
FIG. 3 is a flow chart illustrating a method of identifying an overloaded server.
Figure 4:
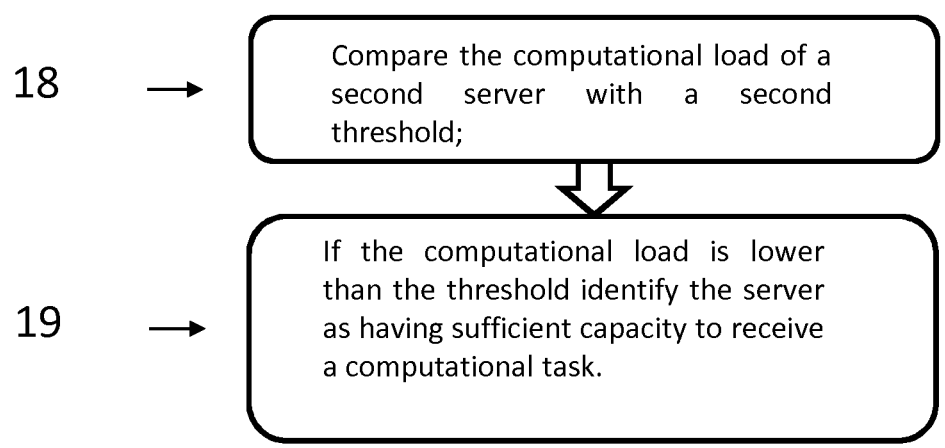
FIG. 4 is a flow chart illustrating a method of identifying a second set of servers which may receive the computational task.
Figure 5:
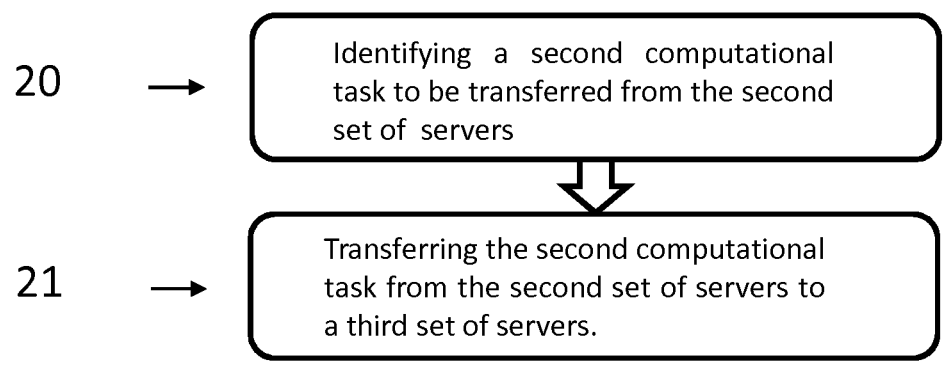
FIG. 5 is a flow chart illustrating a method of freeing resources in a receiving server.

In an embodiment, a single computational task may be identified as suitable for transfer to another server, which has the capacity to implement that computational task. However, it may be necessary to rearrange the tasks on other servers in order to accommodate a computational task from an overloaded server. In an embodiment, where no server can receive a computational task from an overloaded server, a rearrangement of other tasks is needed. FIGS. 3 to 5 illustrate methods for dealing with a server overload. FIG. 3 is a flow chart for identifying an overloaded server. The first step comprises comparing the computational load of the server 16 with a threshold and, if the computational load is greater than the threshold, identifying the server as overloaded 17. In an embodiment, each of the servers in the network is tested in this way. In an embodiment, the threshold is different for each server depending on the server capacity. FIG. 4 is a flow chart of a method of identifying a second set of servers which may receive the computational task. The computational load of each server is compared with a threshold 18 and if the computational load is lower than a threshold, then the server is identified as "underloaded" 19 and the computational task may be transferred to it, provided that the network resources are available. In an embodiment, this process is repeated on other servers to identify a set of servers to which the computational task may be transferred. FIG. 5 is a flow chart of a method of freeing resources in a receiving server. A second computational task is identified as being transferable from the second set of servers 20. The second computational task is then transferred to a third set of servers 21. The second set of servers then has sufficient available capacity to receive the first computational task from the first set of servers, the latter having been identified as overloaded.

When transferring computational tasks, the network capacity must be considered as well as the computational capacity of the destination server. In an embodiment, a simple heuristic algorithm is used which selects the least loaded server which can be reached using the available bandwidth.

Figure 6:
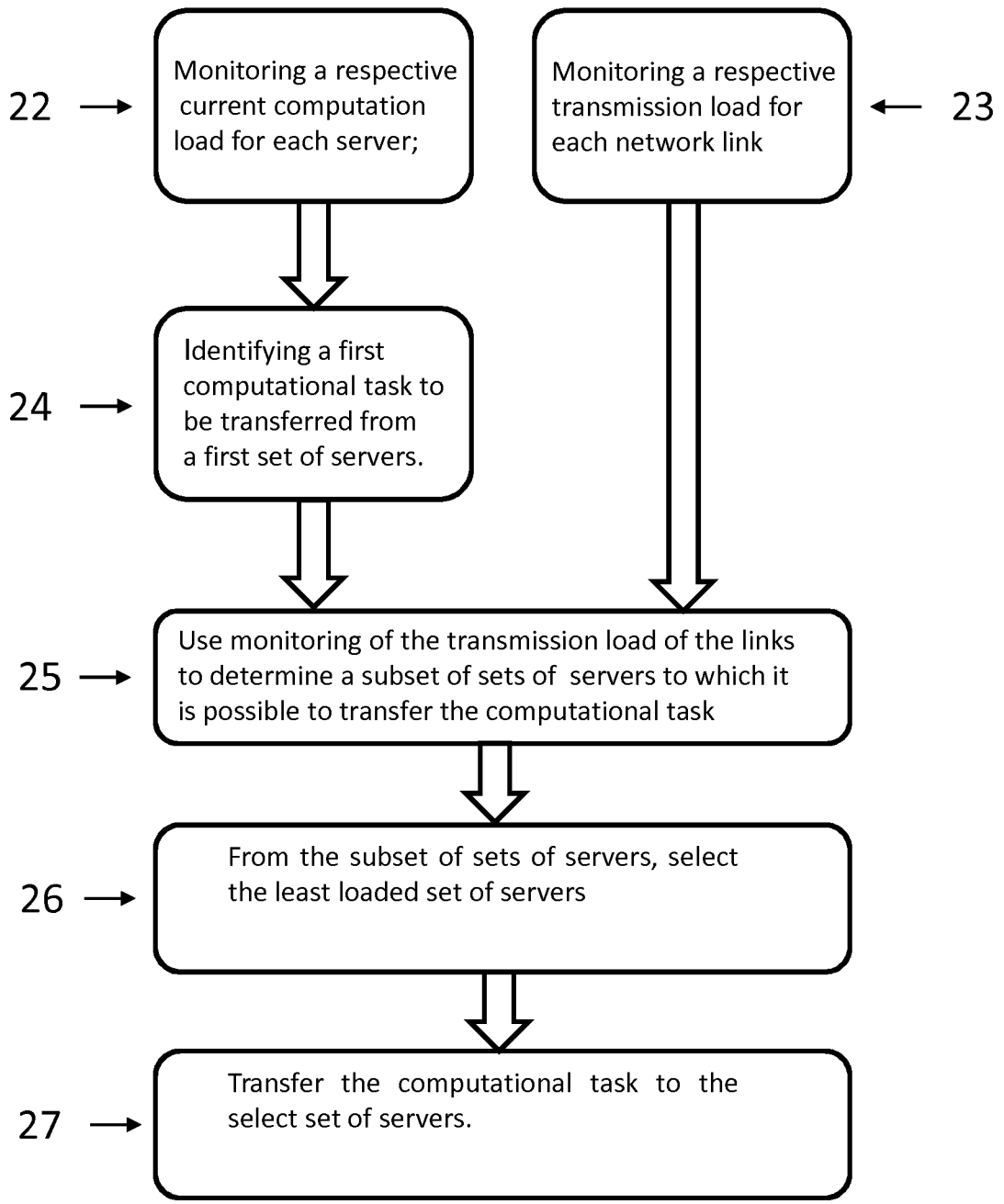
FIG. 6 is a flow chart which illustrates the steps of a method of reallocating a computational task according to an embodiment.

FIG. 6 is a flow chart which illustrates the steps of this method. The respective computational loads of each of the servers and the respective transmission loads of the network links are monitored 22, 23. If a computational task is identified as being transferable to another set of servers 24, then the monitoring of the transmission load of the links is then used to determine a subset of the sets of servers 25 to which it is possible to transfer the computational task based on the available bandwidth. The subset of sets refers to a subset selected from all the sets of servers in the data center. In an embodiment the sets of servers are virtual PODs and the subset comprises a group of virtual PODs identified from all the virtual PODs in the data center, to which it is possible, based on the network conditions, to transfer the computational task. From the subset of sets for which the network is sufficient, a set is selected based on computational load of the set. An optimal set of one or more servers is identified from the selected subset, e.g. based on the available computational resources of the servers. For example, the least loaded set from the subset is selected 26. Then, the computational task is transferred 27.

In another embodiment, the set of servers is selected on the basis of the greatest available bandwidth. In some examples, identifying the set of servers to transfer the computational task to comprises using the monitoring of computational load to identify a plurality of sets of servers (i.e. a subset of the sets of servers) to which the computational task can be transferred, e.g. since there is determined to be sufficient computational resources for the computational task. From the subset, one set is selected. The selection of the set may be based on network criteria, e.g. based on the bandwidth of the network available to transfer the computational task to each of the sets of servers. For example, the set of servers selected is an optimal set based on the available network resources. For example, the set of servers connected using the least loaded network links is selected.

In yet another embodiment, a bin packing algorithm such as first fit decreasing or best fit decreasing is used when multiple computational tasks are to be transferred. The person skilled in the art will recognize that a large number of different options are available and the invention is not limited to the details of any one algorithm.

In an alternative embodiment, multi-objective optimization algorithms are used to simultaneously dimension multiple objectives, such as load balancing between servers, quality of service maintenance, congestion avoidance and power consumption. Alternative approaches are possible using multi-objective algorithms. One of these is to optimize a first objective and then as far as it possible optimize a second objective. For example, an optimization algorithm which first focuses upon load balancing between servers and then looks to quality of service in the network. In another embodiment, the network objectives such as quality of service and congestion avoidance are tackled first, resulting in a set of allowable transfers, balances as far as possible the server loads, using the allowable transfers. In an alternative embodiment, multi-objective algorithms which combine objectives into a single factor and then optimize the combined factor are used. Intelligent search methods can be used to find near-optimal solutions with reasonable runtime. In an embodiment, a fuzzy-logic based evaluation approach is used. In another embodiment, a genetic algorithm could be used for combining different objectives and efficiently searching global optimal solutions, respectively.

In an embodiment, the resources optimization may be improved using a prediction algorithm that predicts server and traffic load. In an embodiment, the predictions are used in combination with current monitoring of network conditions.

Figure 7:
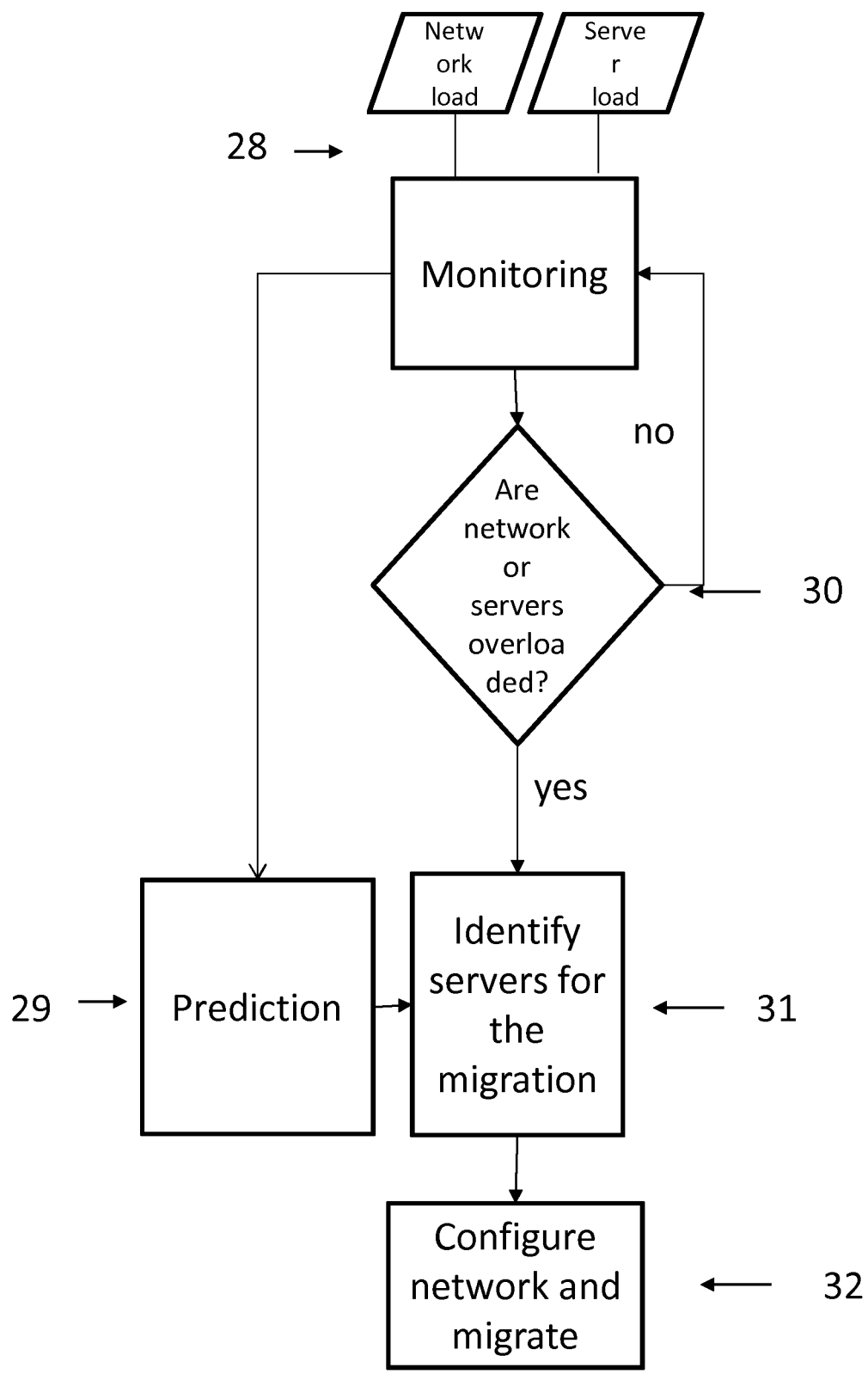
FIG. 7 is a flow chart of a method using a prediction algorithm according to an embodiment.

FIG. 7 is a flow chart of a method using a prediction algorithm according to an embodiment. Both server load and network load are monitored 28. A determination is made as to whether servers are overloaded 30. Prediction 29 of network load is combined with data related to server overload and the monitored values of server and network load to identify required migrations 31. At the final stage, the network is configured and the migrations implemented 32.

Prediction algorithms are typically based upon observation. In an embodiment, a Markov chain is used. In another embodiment, a classical Extensible Markov Model (EEM) algorithm is used. Alternatively, other modelling may be used. Such an algorithm enables the prediction of both server load and network traffic. In addition to prediction by the use of algorithms, in an embodiment, prediction of very high bandwidth flows, or elephant flows, is also performed based on known planned virtual machine migrations and other network events. Elephant flow detections are implemented in real time. In an embodiment, very high data flows or elephant flows are defined as data flows with a bandwidth requirement greater than a defined threshold.

Figure 8:
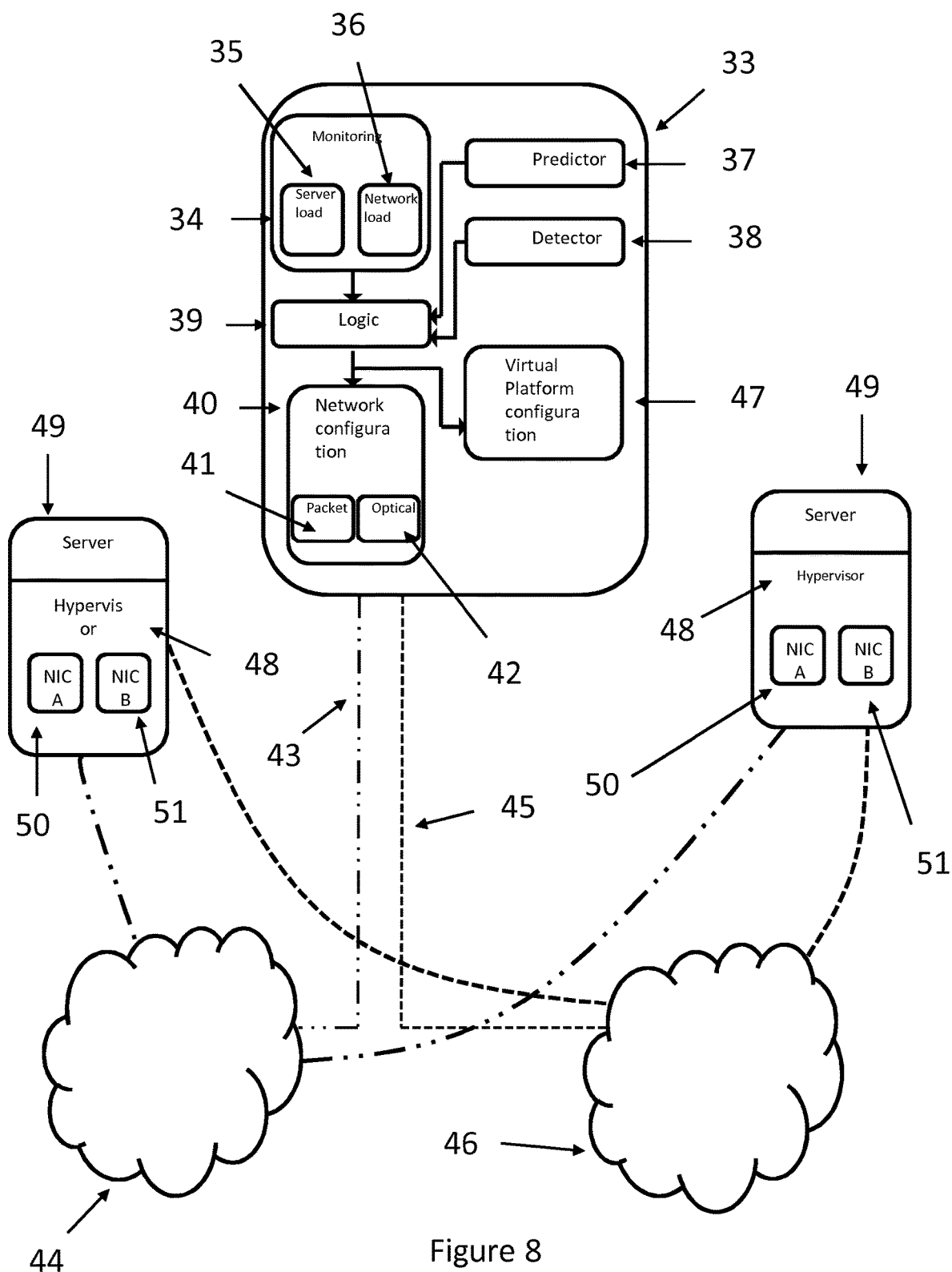
FIG. 8 is a schematic diagram of a Data Center Network according to an embodiment.

FIG. 8 is a schematic diagram of a network controller according to an embodiment. The network controller 33 has the following functionality:

Monitoring Module 34: This module is in charge to monitoring the resource utilization for both server load 35 and network load 36. It detects over-loaded and under-loaded physical machines and monitors traffic load.

Predictor Module 37: This module predicts traffic load and server workload characteristics.

Detector Module 38: This module provides a real-time elephant flows detection. It allows an early detection of elephant flows by real-time packet analysis.

Logic Module 39: This module correlates information about Data Center resources utilization and network load in order to map physical resources into a specific vPOD. It implements algorithms to find the best virtual machines (VMs) to offload from the host and the best hosts for migrating VMs.

Network Configuration Module 40: This module configures the underlying network according the policies defined by the logic. For example, it configures network devices for migrating computational tasks between PODs (e.g., migration of running VMs, smart offloading of the elephant flows). In an embodiment, there are two sub-units, one 41 for control of a packet switched network and one 42 for control of an optical offload network. These sub-units provide control information 43 for the packet switched network 44 and, in an embodiment, control information 45 for the optical network 46

Virtual platform configuration Module 47: This module provides, to the hypervisor 48 located in a server 49, policies for a servers setting. Each hypervisor has a network card 50 for the packet switched network, and, in an embodiment, a further network card 51 for an optical offload network.

In an embodiment, the Controller collects information about network load and Data Center resources utilization using specific monitoring functions. In an embodiment, an Open Flow (OF) controller is provided, which enables the use of OF (per-flow and per-port) statistics, for information about network load. In an embodiment, information about the servers' load may be provided by a Virtual Machine Manager (VMM).

In an embodiment, the monitoring of the server load is performed using a threshold-based overload detection approach. In this case, the resources utilization of the host is compared with a defined threshold (upper-th) to detect overloaded machines. In a similar way, comparing the resources utilization with a lower-th, the under-loaded servers are detected. In an embodiment, the monitoring module includes two databases for storing the network and server status information. With this approach, the available resources for workload allocation and the possible virtual machines (VMs) to migrate with the best hosts for migrating VMs (i.e., server load) are identified. Correlating this information with the network load information, the logic module establishes how to assign the physical resources to vPODs for workloads instantiation and/or which VMs to migrate. In an embodiment, the logic module implements a multi-objective optimization algorithm with the aim of simultaneously optimizing possibly conflicting objectives (i.e., efficient usage of multidimensional resources, low energy consumption costs, avoiding congestion, meeting application specific QoS requirements). Intelligent search methods could be used to find near-optimal solutions with reasonable runtime. In an embodiment, the controller implements a fuzzy-logic based evaluation approach. In another embodiment, the controller implements a genetic algorithm for combining different objectives and efficiently searching global optimal solutions, respectively.

Figure 9:
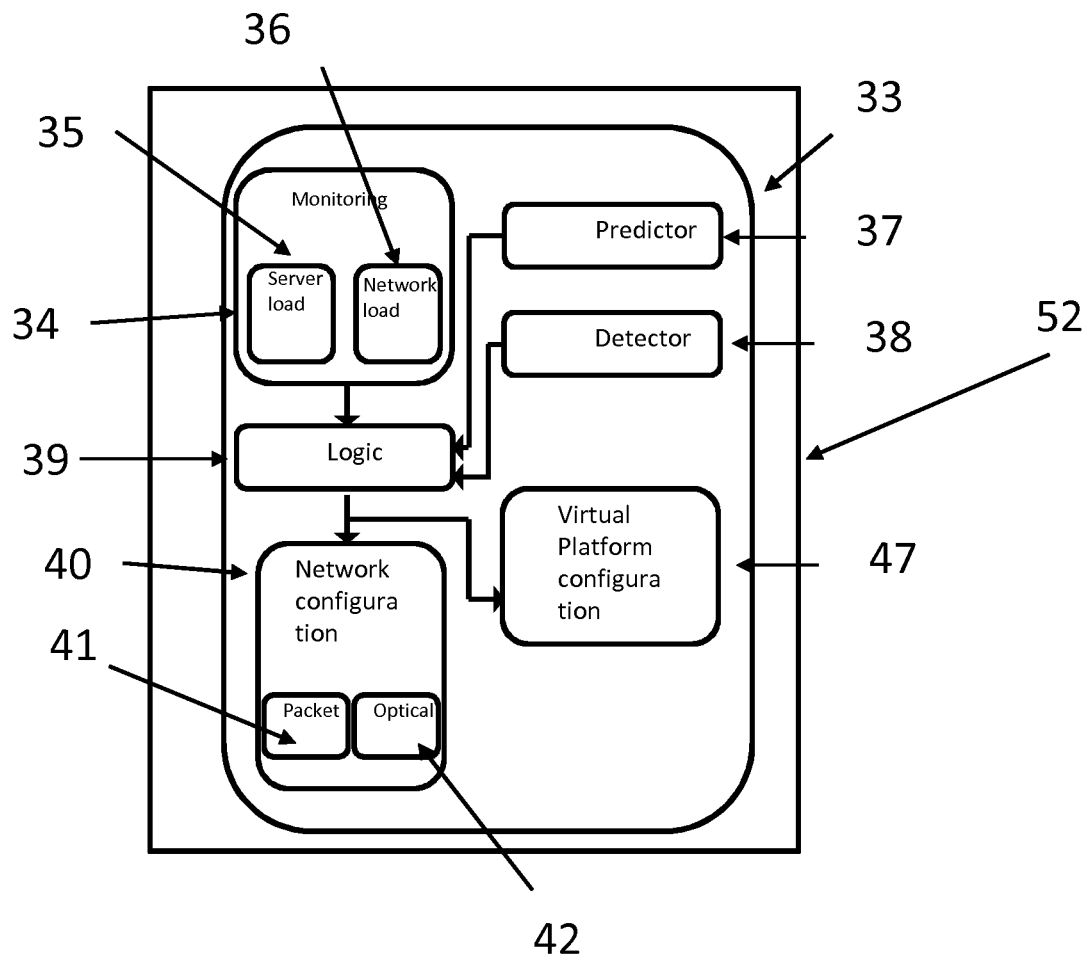
FIG. 9 is schematic diagram of a network controller implemented within a Hypervisors' orchestrator.

The person skilled in the art will appreciate that there are alternative ways to implement the controller architecture. FIG. 9 is schematic diagram of a network controller, in which the controller is implemented within of the Hypervisors' orchestrator 52.

Figure 10:
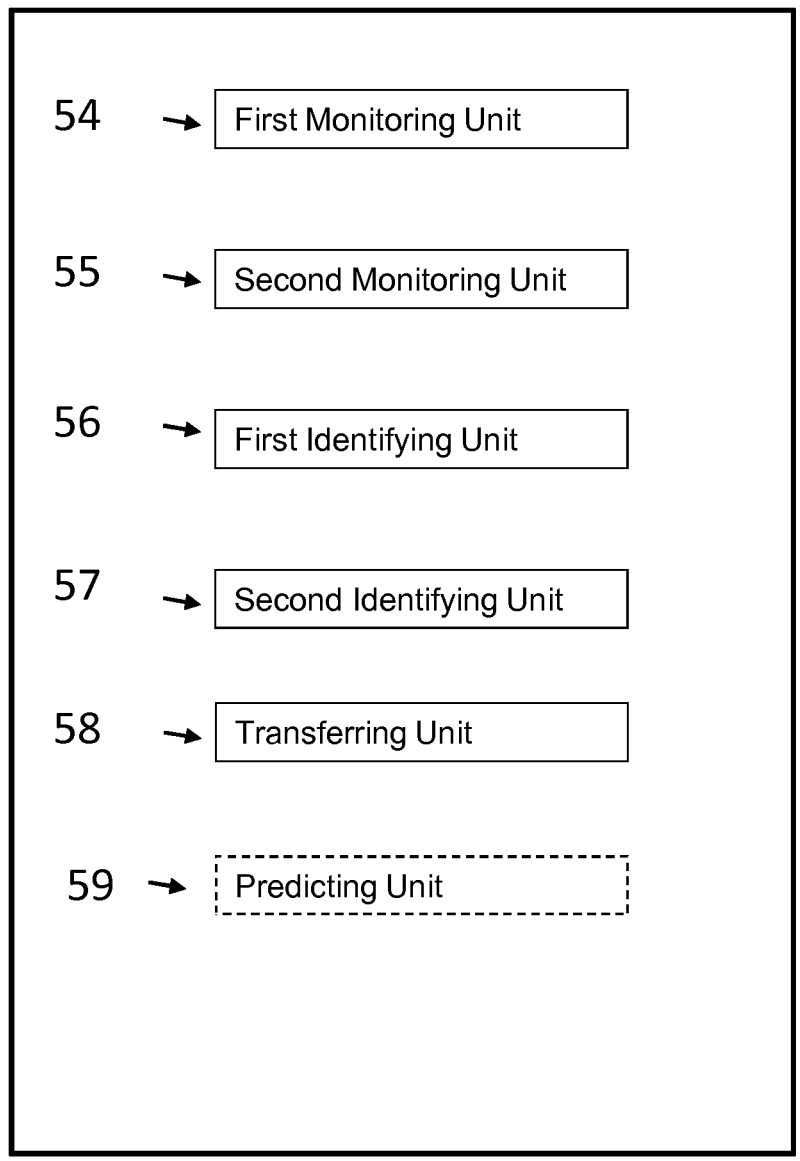
FIG. 10 is a schematic diagram illustrating the logical units of an apparatus for use in a network controller 53 according to an embodiment.

FIG. 10 is a schematic diagram illustrating the logical units of an apparatus for use in a network controller 53 according to an embodiment. The apparatus comprises a first monitoring unit 54 for monitoring server loads, a second monitoring unit for monitoring network loads 55, a first identifying unit 56 for identifying a first computational task to be transferred from a first server, and a second identifying unit 57 a second server to which the first computational task may be transferred and a transferring unit 58 for providing instructions to transfer a computation task. In an embodiment there is further provided a predicting unit 59 for predicting network and server loads.

Figure 11:
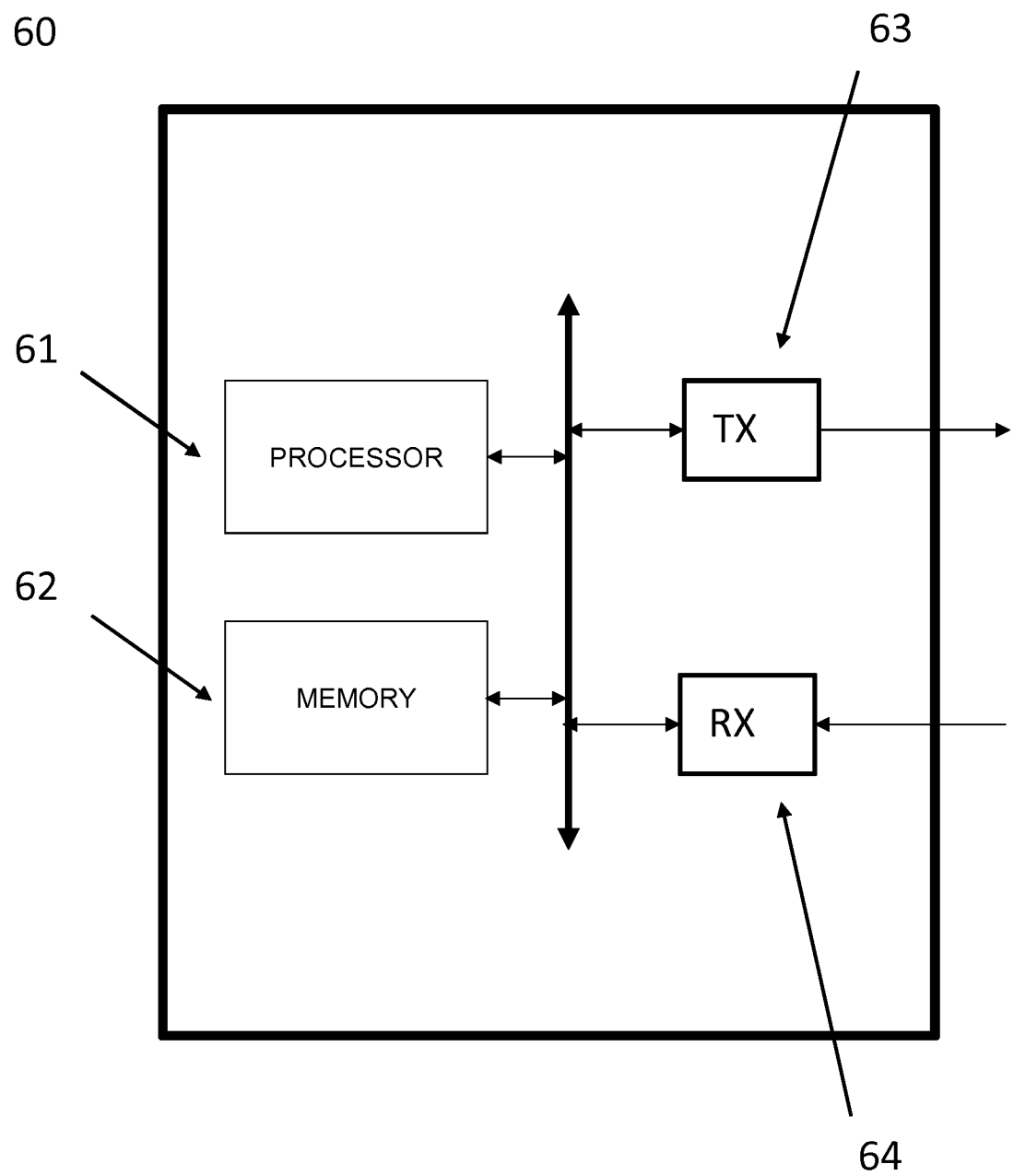
FIG. 11 is a schematic diagram of a network controller according to an embodiment.

FIG. 11 is a schematic diagram of a controller according to embodiment. The controller 60 comprises a processor 61, a memory 62 for storing data and instructions, a transmitter 63 for transmitting data to the communications network, and a receiver 64 for receiving data from the communications network. The controller is configured to:

monitor a respective current computation load for each server, each computational load comprising one or more computational tasks;

monitor a respective transmission load for each network link;

identify a first computational task to be transferred from a first set of one or more servers;

identify a second set of one or more servers to which the first computational task may be transferred, by:

using the respective current computational load of the second set of servers to determine that the second set of servers has sufficient available computational resources to implement the computational task; and identifying network links for transferring the computational task and using the respective transmission loads of the identified links to determine that the that there is sufficient network capacity to transfer the computational task from the first set of servers to the second set of servers; and provide instructions to transfer the computational task from the first set of servers to the second set of servers.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method of controlling resource allocation in a data center, the data center comprising a plurality of servers connected by a plurality of network links, the method comprising:

monitoring a respective current computational load for each server, each computational load comprising one or more computational tasks;

monitoring a respective transmission load for each network link;

identifying a first computational task to be transferred from a first set of servers;

identifying, based on the respective current computational load for each server and the respective transmission load for each network link, a second set of servers to which the first computational task may be transferred, the identification of the second set of servers comprises:

using the respective current computational load of the second set of servers, determining that the second set of servers has available computational resources to implement the first computational task;

identifying network links for transferring the first computational task; and using the respective transmission loads of the identified network links, determining that network capacity is sufficient to transfer the first computational task from the first set of servers to the second set of servers;

implementing an optimization algorithm to determine a possibility of rearrangement of a second computational task of the second set of servers, wherein the possibility of the rearrangement of the second computational task comprises a possibility of transferring a second computational task from the second set of servers to a third set of servers, and wherein the rearrangement of the second computational task enables transferring of the first computational task from the first set of servers to the second set of servers; and transferring the first computational task from the first set of servers to the second set of servers based on the identification of the second set of servers and the implementation of the optimization algorithm.

2. The method according to claim 1, wherein the first computational task is identified in response to the first set of servers being identified as overloaded, wherein identifying the first set of servers as overloaded comprises determining whether the current computational load of the first set of servers is above a first threshold, and wherein determining that the second set of servers has available computational resources comprises determining whether the current computational load of the second set of servers is below a second threshold.

3. The method according to claim 1, further comprising, prior to the transfer of the first computational task, transferring the second computational task from the second set of servers to the third set of servers.

4. The method according to claim 1, further comprising implementing the optimization algorithm to determine if a rearrangement of computational tasks is possible which will either:
reduce one or more of: power consumption, network congestion and server overload; or
increase one or more of computation speed on one or more servers, and network quality of service.

5. The method according to claim 1, wherein the optimization algorithm is a multi-objective algorithm, a genetic algorithm, or a heuristic algorithm.

6. The method according to claim 1, wherein the monitoring of network load further comprises identifying very high bandwidth flows, wherein a very high bandwidth flow is a flow with a bandwidth requirement higher than a bandwidth threshold.

7. The method according to claim 1, further comprising:
predicting a computational load to give a predicted computational load; and
using the predicted computational load in the identifying the second set of servers to which the first computational task may be transferred.

8. The method according to claim 1, further comprising:
predicting a network load to give a predicted network load; and
using the predicted network load in the identifying the second set of servers to which the first computational task may be transferred.

9. The method according to claim 8, wherein the predicting comprises using an extensible Markov Model.

10. A controller for a data center network comprising a plurality of servers connected by a plurality of network links, the controller comprising:
a processor;
a memory for storing data and instructions;
a transmitter for transmitting data to a communications network; and
a receiver for receiving data from the communications network;
wherein the controller is configured to:
monitor a respective current computation load for each server, each computational load comprising one or more computational tasks;
monitor a respective transmission load for each network link;
identify a first computational task to be transferred from a first set of servers;
identify, based on the respective current computational load for each server and the respective transmission load for each network link, a second set of servers to which the first computational task may be transferred, the identification of the second set of servers comprises:
using the respective current computational load of the second set of servers, determine that the second set of servers has available computational resources to implement the first computational task;
identify network links for transferring the first computational task; and
using the respective transmission loads of the identified links, determine that network capacity is sufficient to transfer the first computational task from the first set of servers to the second set of servers;
implement an optimization algorithm to determine a possibility of rearrangement of a second computational task of the second set of servers, wherein the possibility of the rearrangement of the second computational task comprises a possibility of transferring a second computational task from the second set of servers to a third set of servers, and wherein the rearrangement of the second computational task enables the transfer of the first computational task from the first set of servers to the second set of servers; and
provide instructions to transfer the first computational task from the first set of servers to the second set of servers based on the identification of the second set of servers and the implementation of the optimization algorithm.

11. The controller according to claim 10, further configured to identify the first computational task in response to the first set of servers being identified as overloaded, wherein identifying the first set of servers as overloaded comprises determining whether the current computational load of the first set of servers is above a first threshold, and wherein determining that the second set of servers has capacity comprises determining whether the current computational load of the second set of servers is below a second threshold.

12. The controller according to claim 10, further configured to, prior to the transfer of the first computational task, transfer the second computational task from the second set of servers to the third set of servers.

13. The controller according to claim 10, further configured to implement the optimization algorithm to determine if a rearrangement of computational tasks is possible which will either:
reduce one or more of: power consumption, network congestion and server overload; or
increase one or more of computation speed on one or more servers, and network quality of service.

14. The controller according to claim 10, further configured to identify very high bandwidth flows, wherein a very high bandwidth flow is a flow with a bandwidth requirement higher than a bandwidth threshold.

15. The controller according to claim 10, further configured to:
predict server usage to give a predicted computational load; and
use the predicted computational load to identify the second set of servers to which the first computational task may be transferred.

16. The controller according to claim 10, further configured to:
predict network usage to give a predicted network load; and
use the predicted network load to identify the second set of servers to which the first computational task may be transferred.

17. The controller according to claim 16, configured to predict one or more of network usage and server usage by using an extensible Markov Model.

18. A data center network comprising:
a plurality of servers connected by a plurality of network links; and a controller, wherein the controller comprises:
  a processor;
  a memory for storing data and instructions;
  a transmitter for transmitting data to a communications network; and
  a receiver for receiving data from the communications network;
  wherein the controller is configured to:
    monitor a respective current computation load for each server, each computational load comprising one or more computational tasks;
    monitor a respective transmission load for each network link;
    identify a first computational task to be transferred from a first set of servers;
    identify, based on the respective current computational load for each server and the respective transmission load for each network link, a second set of servers to which the first computational task may be transferred, the identification of the second set of servers comprises:
      using the respective current computational load of the second set of servers, determine that the second set of servers has available computational resources to implement the first computational task; and
      identify network links for transferring the first computational task; and
      using the respective transmission loads of the identified links determine that network capacity is sufficient to transfer the first computational task from the first set of servers to the second set of servers;
    implement an optimization algorithm to determine a possibility of rearrangement of a second computational task of the second set of servers, wherein the possibility of the rearrangement of the second computational task comprises a possibility of transferring a second computational task from the second set of servers to a third set of servers, and wherein the rearrangement of the second computational task enables the transfer of the first computational task from the first set of servers to the second set of servers; and
    provide instructions to transfer the first computational task from the first set of servers to the second set of servers based on the identification of the second set of servers and the implementation of the optimization algorithm.

* * * * *